US006598847B2

(12) United States Patent
Doucet et al.

(10) Patent No.: US 6,598,847 B2
(45) Date of Patent: Jul. 29, 2003

(54) SUPPORT BEAM

(75) Inventors: Jules Doucet, St-David de Falardeau (CA); Dominique Simard, Chicoutimi nord (CA)

(73) Assignee: PBI Industries Inc. (CA)

( * ) Notice: Subject to any disclaimer, the term of this patent is extended or adjusted under 35 U.S.C. 154(b) by 0 days.

(21) Appl. No.: 10/071,436

(22) Filed: Feb. 8, 2002

(65) Prior Publication Data

US 2002/0104949 A1 Aug. 8, 2002

(30) Foreign Application Priority Data

Feb. 8, 2001  (CA) ............................................. 2335933
Sep. 11, 2001 (CA) ............................................. 2363299

(51) Int. Cl.[7] ............................................. A47B 91/00
(52) U.S. Cl. ................................. 248/346.02; 108/56.3
(58) Field of Search .................. 248/346.02; 108/56.3, 108/54.1, 55.5; 34/518

(56) References Cited

U.S. PATENT DOCUMENTS

| 192,001 | A | | 6/1877 | Pfeffer | |
|---|---|---|---|---|---|
| 851,789 | A | | 4/1907 | Alexander | |
| 1,515,214 | A | | 11/1924 | Kelleher et al. | |
| 1,608,918 | A | | 11/1926 | Alexander | |
| 1,745,479 | A | | 2/1930 | Few | |
| 2,614,689 | A | * | 10/1952 | Miller | 108/55.5 |
| 2,679,111 | A | | 5/1954 | Leischner | 34/6 |
| 2,841,350 | A | * | 7/1958 | Chronister | 108/56.3 |
| 2,903,126 | A | * | 9/1959 | Heath | 108/56.3 |
| 3,454,156 | A | | 7/1969 | Chatten | 206/65 |
| 3,480,178 | A | | 11/1969 | Morgan | 220/97 |
| 3,567,068 | A | | 3/1971 | Carfizzi | 220/69 |
| 3,691,965 | A | | 9/1972 | Cloyd | 108/58 |
| 3,880,286 | A | * | 4/1975 | Wegener | 108/54.1 |
| 3,900,957 | A | | 8/1975 | Denton et al. | 34/13.8 |
| 3,907,130 | A | | 9/1975 | Hutcheson | 214/10.5 R |
| 4,293,605 | A | | 10/1981 | Persson et al. | 428/126 |
| 4,316,419 | A | | 2/1982 | Cupido | 108/56.1 |
| 4,375,265 | A | | 3/1983 | van de Wetering et al. | 220/1.5 |
| 4,663,860 | A | | 5/1987 | Beall | 34/13.4 |
| 4,788,777 | A | | 12/1988 | Davis | 34/239 |
| 5,345,695 | A | | 9/1994 | Graham | 34/94 |
| D378,347 | S | | 3/1997 | Bain | D8/354 |
| 5,704,134 | A | | 1/1998 | Carter et al. | 34/396 |
| 5,789,057 | A | | 8/1998 | Naitou et al. | 428/73 |
| 5,813,137 | A | | 9/1998 | Townsend | 34/518 |
| 6,134,803 | A | | 10/2000 | Gilchrist et al. | 34/94 |
| 6,179,273 | B1 | | 1/2001 | Edmunds, III et al. | 256/13.1 |

* cited by examiner

Primary Examiner—Ramon O. Ramirez
(74) Attorney, Agent, or Firm—Bourque & Associates, P.A.

(57) ABSTRACT

The support beam is an integrally-molded piece of a rigid plastic material or any other polymer or composite material, in particular a mixture of plastic material and saw dust. The support beam comprises a pair of spaced out lateral walls laid out in parallel. A plurality of spaced-apart and transversally-extending flanges are disposed between the parallel walls. The transversal flanges are configured and disposed according to at least one pattern at the end sections of the support beams and at least one pattern at the central section thereof. The support beam is designed in such a way as that the end sections have a higher compression strength than that of the central section.

The support beam offers a very advantageous alternative to the support beams hitherto used for handling purposes, notably those made of solid wood or superimposed particle board sections. It can be used together with a corresponding support slat and fastened to the articles it supports with the help of a metallic belt or any other such type of fastener. The support beam is reusable, weather resistant, recyclable and possesses advantageous phytopathogenic properties.

16 Claims, 4 Drawing Sheets

SUPPORT BEAM

The present invention relates to a support beam that can be advantageously used during the handling of stacked articles or in any other such applicable situation. This support beam is notably well adapted for supporting bundles of wood pieces, and in particular with plywood or particle boards.

During the handling of stacked articles, it is important that the different sets be stacked in a stable and secure fashion. This has not always been the case up to now, notably in the case of articles whose dimensions exceed those of a standard wooden pallet. For example, in the case of plywood boards, a certain number of boards are placed one on top of the other and tightened with metallic belts or any other such fastener so that the whole is integral. A pair of support beams, generally made from a solid piece of wood or from the superposition of particle boards nailed together and cut according to the desired width, are then placed under each bundle in order to space them from the floor, in the case of the bottom bundle, or as well on top of a bundle located just below. This spacing allows the insertion of forks from a fork lift under the bundle in order to lift and move it.

One of the main inconvenience of the wooden support beams used up to now is that they are not always uniform and may crack, warp or degrade over time. Restrictions regarding phytopathogens may also forbid their use with articles intended for exportation. As well, the conventional support beams do not offer any or offer little resistance to relative movement between the different stacks when they are placed one on top of the other. In some circumstances, this can cause problems during transport by truck or other means since these bundles may be subject to forces creating relative movement between them.

The present invention is concerned with providing a very advantageous alternative to the support beams used up to now during handling. The support beams can be used with or without corresponding supports slats and may be fastened to the articles they are supporting with the help of belts used to hold the stacked articles together. The use of those support beams allows superior efficiency and a reduced cost. The invention allows the manufacturing of reusable support beams that are weather resistant, recyclable and possessing advantageous phytopathogenic properties.

The various objects, features and advantages of the present invention will be better understood by the reading of the following detailed description, which is made with reference to the appended figures in which.

Figure 1:
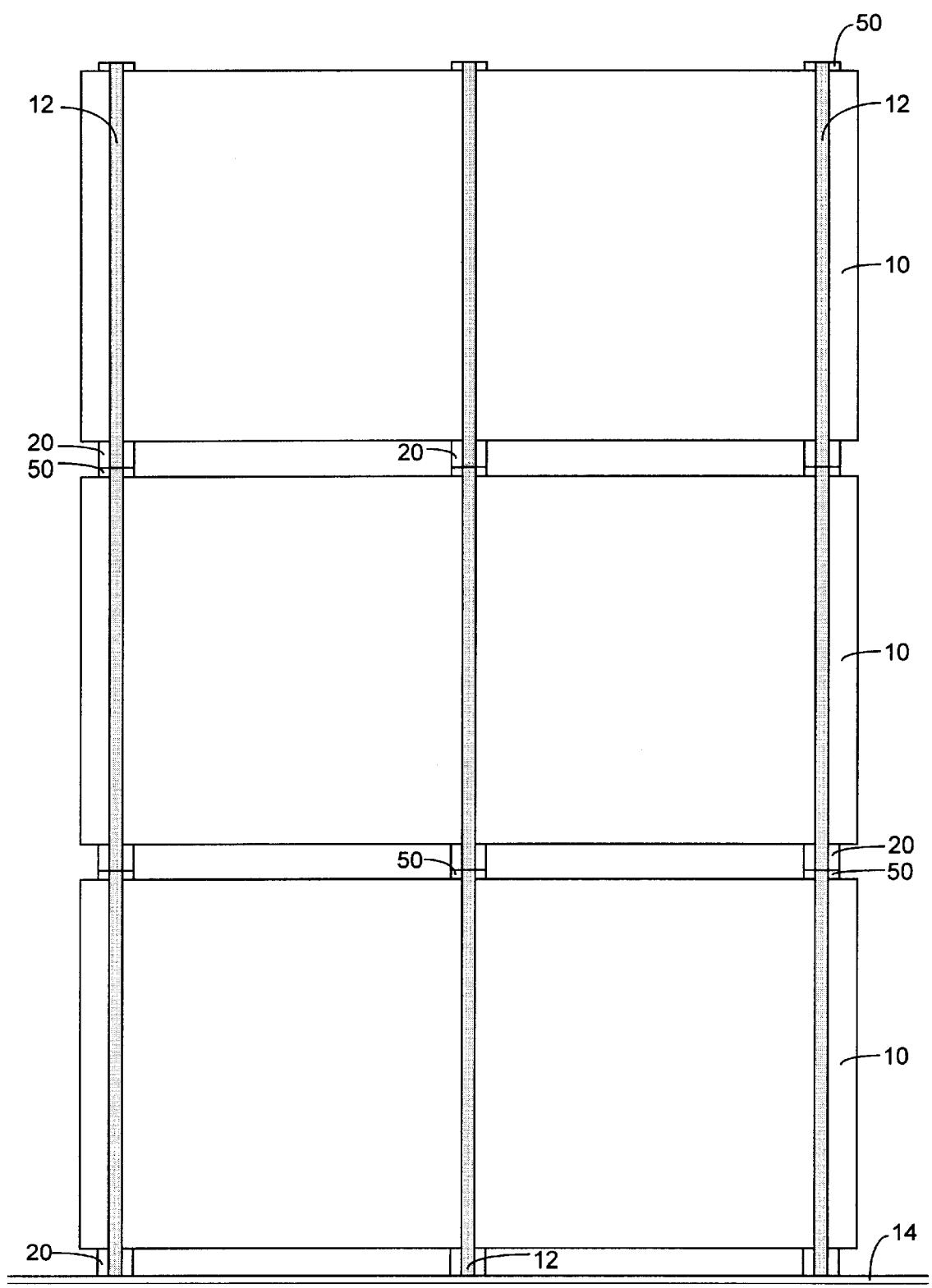
FIG. 1 is an elevation view illustrating an example of three bundles placed one on top of the other and separated by support beams and support slats in a preferred embodiment.

FIG. 1 shows a possible use of the support beams (20) and of the support slats (50). In this example, the support beams (20) are used to support plywood bundles (10). Each bundle (10) comprises a number of plywoods placed one on top of the other. It should be noted that the use of the support beams (20) is not limited to plywood or any other wooden material. They can be used with any other kind of material or in any other context for which their use is advantageous. Moreover, the support beams (20) may be used without support slats (50).

Each bundle (10) is supported by at least two support beams (20). Three support beams (20) are usually used under each bundle (10). The support beams (20) are preferably placed in a parallel fashion and two of them are near the extremities of the bundle (10). The height of the support beams (20) has to be sufficient to allow the insertion of forks from a fork lift, which will be inserted between two equal leveled support beams (20).

In the embodiment illustrated in FIG. 1, each bundle (10) is provided with support slats (50) in equal number and aligned with the corresponding support beams (20). With the exception of the support beams (20) in direct contact with the ground, each support beam (20) preferably lies on a corresponding support slat (50). The support slats (50), usually of rectangular and tapered form, are also preferably of a length that is equivalent to the distance between two opposed sides of the bundle (10).

Preferably, the support beams (20), and if applicable the slats (50), are each molded as an integrally-molded piece and made of a rigid plastic material or any other polymer or composite material having a sufficient or superior strength to that required, particularly regarding compression. Materials that can be used are, for example, low density polyethylene (LDPE), high density polyethylene (HDPE), polypropylene (PP), or a mixture thereof. They can however be made of other materials. It is also possible to combine many other materials for their manufacturing, for example, by using reinforcement materials. When they are made of a composite material, the composite material may comprise saw dust mixed with plastic. The proportion of saw dust can be up to 85% in weight and may even be higher, depending on the strength required from the elements and the plastic material used. It should be noted that the support beams (20) and the support slats (50) may be made from other materials.

The support beams (20) and the support slats (50) are preferably positioned before the corresponding bundle is fastened with the use of belts (12) or any other fastening means. The belts (12) may then be positioned around the support beams (20) and the slats (50), then tightened so that the whole may be integral.

During use, the bottom supporting surface (24) of the support beams (20) rests on top of a corresponding support slat (50) when bundles (10) are placed one on top of the other. The bottom support beams (20) will however be in contact with the ground, while the support slats (50) of the top bundle (10) will not be used. The support beams (20) and the support slats (50) being disposed in identical fashion from one bundle to another, the bundles (10) may be moved and placed in any order, thereby avoiding any compatibility concerns.

Figure 4:
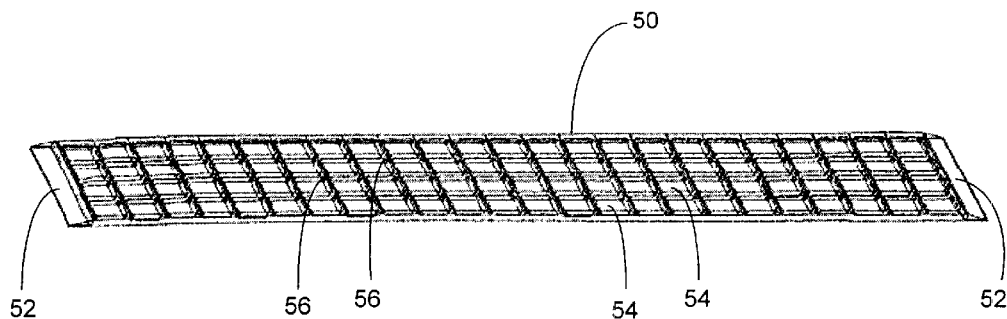
FIG. 4 is a perspective view of the support slat, according to a preferred embodiment.
Figure 5:
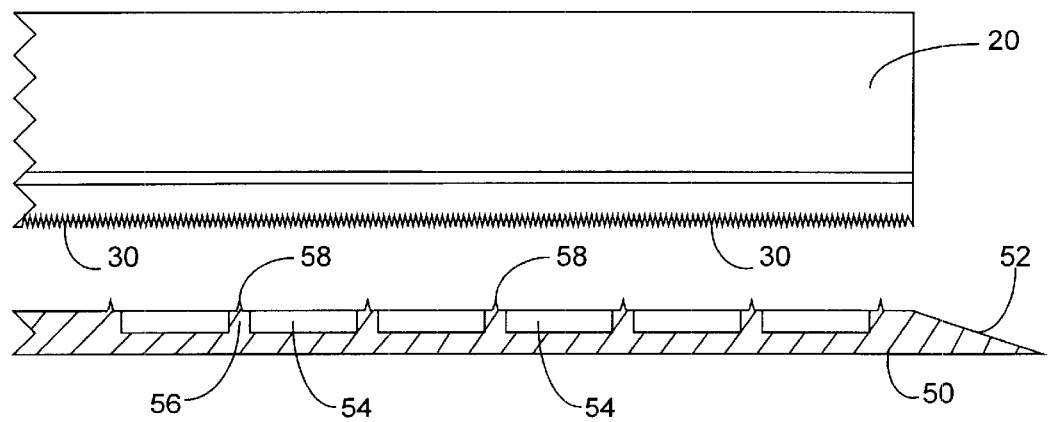
FIG. 5 is a side view of a support beam and of its corresponding slat, according to a preferred embodiment.

As illustrated by FIGS. 4 and 5, each support slat (50) advantageously comprises two tapered ends (52) in order to better control the pressure transmitted by the corresponding belt (12) and to insure a more progressive transition between the horizontal and vertical portions of the belt (12). The angle of the ends (52) is advantageously of about 17°, other values being also possible.

The support slats (50) also comprise a top surface composed of cells (54), which are formed by a plurality of edges (56) disposed transversally and longitudinally. The cells (54) are preferably of rectangular form but may also be of any other form, with or without a bottom. The cells (54) allow a reduction in the quantity of material necessary in manufacturing a slat (50). The support slats (50) are however preferably provided with a bottom and a smooth bottom surface. Again according to the preferred embodiment, each transversal edge (56) forming the cells (54) comprises a thin and tapered projecting rim. Teeth (58) are designed to fit together with bottom teeth (30) located under the support beams (20). Placed on top of one another, these teeth (30, 58) create a resistance to the relative displacement between the bundles (10) in the longitudinal direction of the support beams (20) and support slats (50), thus greatly increasing the stability of the bundles (10). The teeth (58) of each support slats (50) fit together at a compatible teeth (30) multiple of the support beam (20). The teeth (30, 58) are preferably of small depth and it should be noted that those illustrated in FIG. 5 are of exaggerated dimensions for the purpose of illustration. A typical height for the teeth (30, 58) is 1/16 of an inch.

The support slats (50) can also be provided with teeth (58) having a form and configuration different from those illustrated. The support beams (20) would then be provided with corresponding teeth (30). For example, the teeth (58) could be in the form of a "V" when viewed from the top or any other possible form. Rectilinear teeth (58) are however preferred since they avoid the necessity of having to orientate the bundles (10).

As mentioned previously, each support beam (20) is made of a single molded piece and comprises an upper supporting surface (22) and a bottom supporting surface (24). A support beam (20) comprises a pair of spaced out and parallel lateral walls (26). Each of the walls has two opposed longitudinal rims. One of each wall's longitudinal rims is in the same plane as the upper supporting surface (22) and the other as the bottom supporting surface. Although pierced, the upper supporting surface (22) of the support beam (20) is preferably smooth. Each support beam (20) also comprises a plurality of spaced out transversal flanges (32) integrally positioned between the lateral walls (26). The transversal flanges (32) are configured and disposed according to at least one pattern at the end sections (34) of the support beam (20), and at least one pattern at the central section (36) of the support beam (20). The relative size of the end sections (34) may vary from one application to the other. As an example, an end section (34) would typically be in the order of 1/8 of the total length of the support beam (20). Usually, a central section (36) is always longer than the end sections (34).

The support beam (20) is designed as such that the end sections (34) have a higher compression strength than the central section (36). This is necessary since the compression forces are very high at the extremities of the support beam (20) because of the belts (12).

The increase in resistance of the end sections (34) may be achieved in various ways. Preferably, it is attributable to the fact that the transversal flanges (32) of the end sections (34) have an average spacing between each other that is smaller than that of the flanges (32) of the central section (36). It is also possible to plan a decreasing spacing between the transversal flanges (32) starting from the central section (36) towards the end sections (34) of the support beam (20), thus progressively increasing the resistance to compression. Another possible method for increasing the resistance of the end sections (34) is to increase the thickness of the transversal flanges (32).

Figure 2:
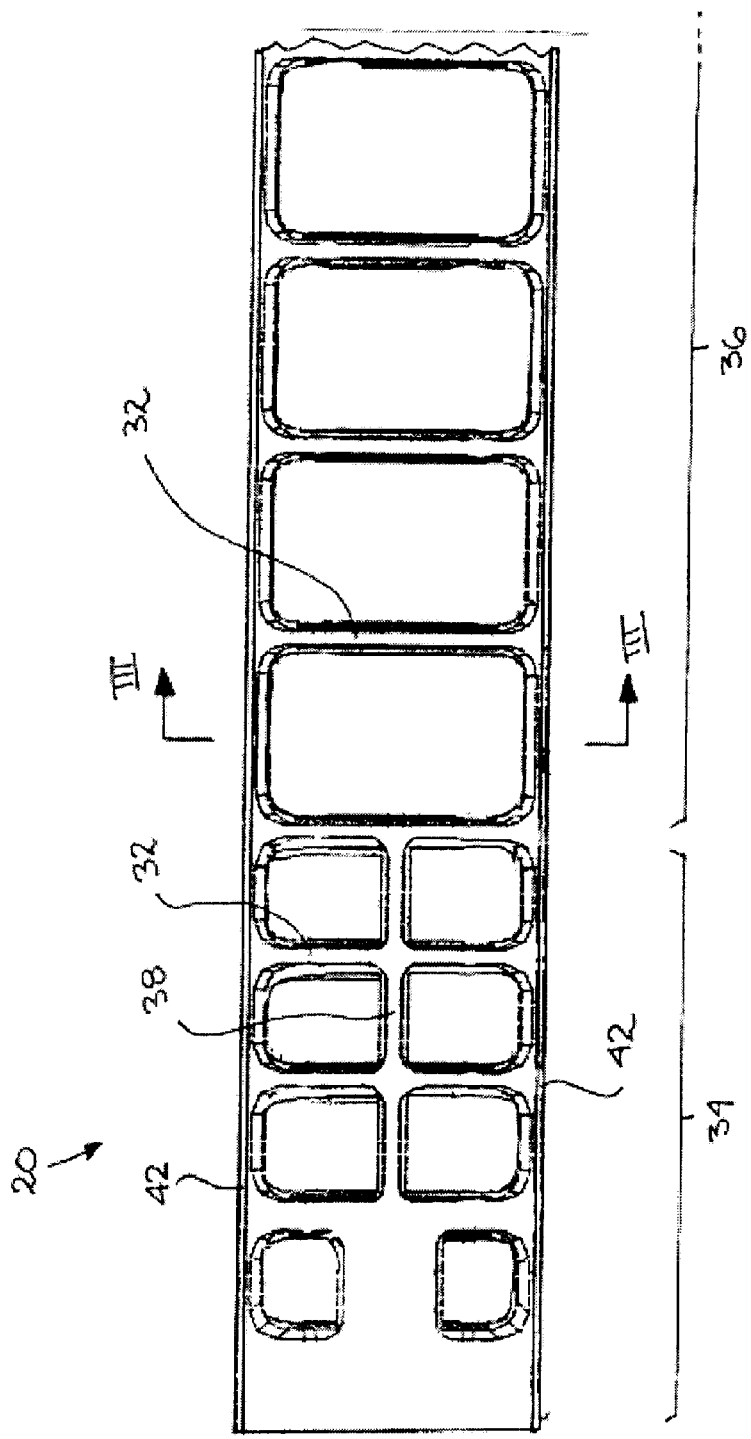
FIG. 2 is a bottom view of a part of the support beam.
Figure 3:
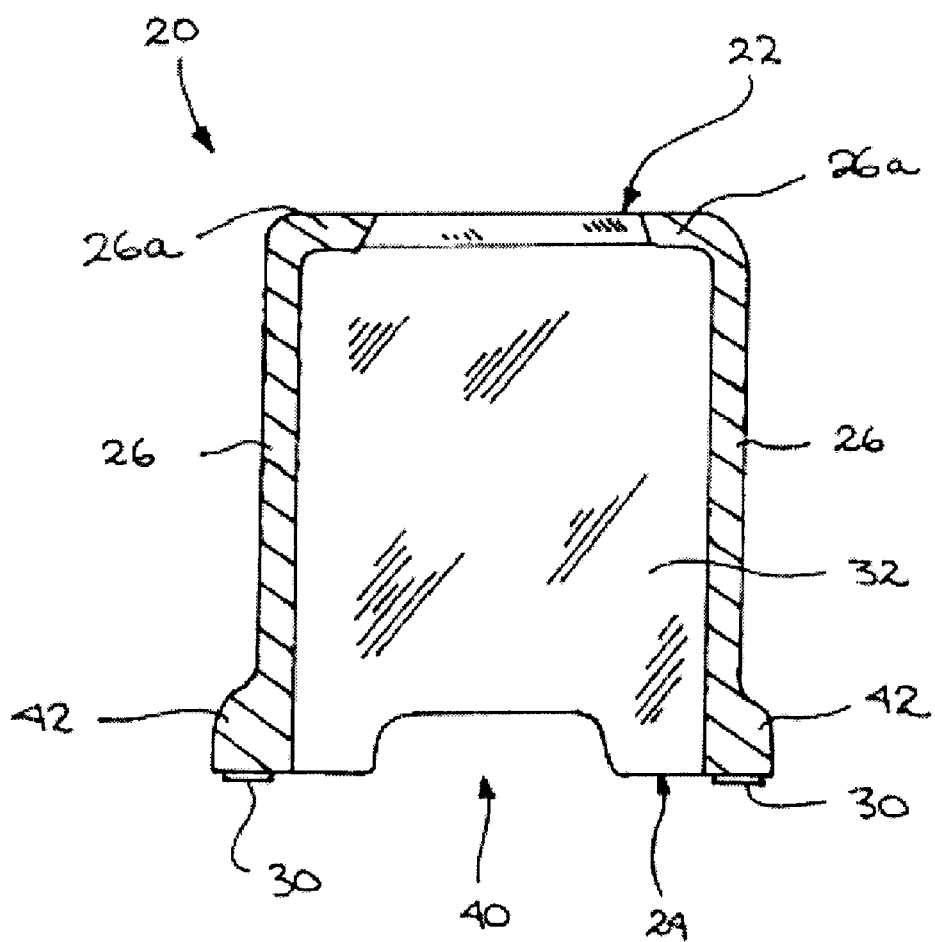
FIG. 3 is a section view of the support beam along the III—III axis in FIG. 2.

Moreover, as illustrated in FIG. 2, the transversal flanges (32) of each end sections (34) may linked together by at least one longitudinal flange (38).

The transversal flanges (32) preferably comprise an upper edge that is in the same plane as the upper supporting surface (22). The top of each transversal flange (32) will thus lean against any article that is in the same plane as the upper supporting surface (22).

Each lateral wall (26) preferably comprises an upper rim (26a) extending longitudinally and projecting towards the interior near the longitudinal edge that is in the same plane as the upper supporting surface (22). The upper rim (26a) thus has an upper face that is in the same plane as the upper supporting surface (22) and forms a continuous surface with the adjacent longitudinal edge. In similar fashion, each transversal flange (32) can comprise a bottom edge in the form of a plateau, the set of bottom edges of the transversal flanges (32) thus forming a canal (40) extending longitudinally under the support beam (20). The canal (40) allows for the passage of the belt (12) or any other such fastener.

Always according to a preferred embodiment, each lateral wall (26) comprises a protuberance (42) extending longitudinally and projecting towards the exterior near the longitudinal edge that is in the same plane as the bottom supporting surface (24). The protuberance has a bottom face that is in the same plane as the bottom supporting surface (24) and thus forms a continuous surface with the adjacent bottom edge.

The teeth (30) of the support beams (20) are laid out in two rows, each located under a protuberance (42).

It should be noted that the exact construction of the different parts of the support beam (20) and of the support slat (50) depends on the projected use. It is then possible to manufacture support beams (20) or support slats (50) having different form or configuration than those illustrated. It should also be noted that the support beams (20) and the support slats (50) are not necessarily of the same length but of course have to be aligned one in regards to the other.

Although preferred embodiments of the invention have been described in detail and illustrated in the appended figures, the invention is not limited to those embodiments alone and many changes and modifications can be carried out by a person skilled in the art without deviating from the scope or the spirit of the invention.

We claim:

1. A one-piece integrally-molded support beam having an upper load-receiving surface and a bottom supporting surface, the support beam comprising:

a pair of spaced-apart and parallelly-disposed elongated side walls, each side wall having two longitudinal edges, one of which is coplanar with the load-receiving surface and the other with the bottom supporting surface; and a plurality of spaced-apart and transversally-extending flanges disposed between the side walls and integrally-attached thereto, the flanges being configured and disposed in accordance to at least one pattern at the opposite end sections of the support beams and at least one pattern at a central section thereof;

whereby the end sections have a higher compression strength than that of the central section.

2. A support beam according to claim 1, wherein the transversal flanges of the end sections have an average spacing which is smaller than that of the central section.

3. A support beam according to claim 2, wherein the spacing between adjacent flanges of the end sections decreases towards the ends of the support beam.

4. A support beam according to claim 3, wherein the transversal flanges of the central section have a uniform spacing.

5. A support beam according to claim 1, wherein the transversal flanges at each end section are interconnected by at least one longitudinally-disposed flange.

6. A support beam according to claim 1, wherein at least some of the transversal flanges comprise an upper edge which is coplanar with the upper supporting surface.

7. A support beam according to claim 1, wherein each side wall comprises an upper rim extending longitudinally and projecting towards the interior near the longitudinal edge that is coplanar with the other supporting surface, the upper rim having an upper face which is in the same plane as the upper supporting surface and forming a continuous surface with the adjacent longitudinal edge.

8. A support beam according to claim 1, wherein each transversal flange comprises a stepped bottom edge, the stepped bottom edges of the transversal flanges defining a continuous longitudinally-extending channel.

9. A support beam according to claim 8, wherein the lateral portions of the stepped bottom edges of the transversal flanges are coplanar with the bottom supporting surface.

10. A support beam according to claim 1, wherein each side wall comprises a protuberance extending longitudinally and projecting towards the exterior near the longitudinal edge that is coplanar with the bottom supporting surface, the protuberance having a bottom face which is coplanar with the bottom supporting surface and forming a continuous surface with the adjacent longitudinal edge.

11. A support beam according to claim 10, wherein the protuberance comprises a plurality of longitudinally-extending toothed-rail projecting towards the bottom of the bottom surface.

12. A support beam according to claim 1, wherein the support beam is made of a polymer material.

13. A support beam according to claim 12, wherein the polymer material is selected from a group consisting of low density polyethylene (LDPE), high density polyethylene (HDPE), polypropylene (PP), and a mixture thereof.

14. A support beam according to claim 1, wherein the support beam is made of a composite material.

15. A support beam according to claim 14, wherein the composite material comprises wood dust and at least one other material selected from a group consisting of low density polyethylene (LDPE), high density polyethylene (HDPE), polypropylene (PP), and a mixture thereof.

16. A support beam according to claim 15, wherein the wood dust are present in a proportion ranging from more than 0 to 85% by weight.

\* \* \* \* \*